Figure 1:
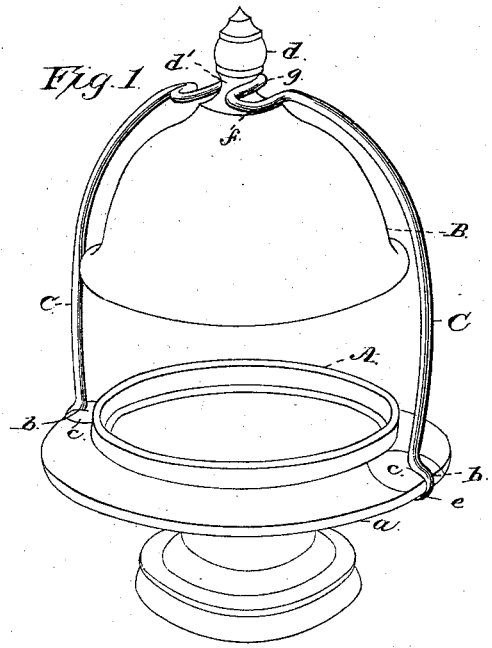

(No Model.)

W. K. ELSON & A. J. SMITH.
COVERED DISH.

No. 304,997. Patented Sept. 9, 1884.

WITNESSES
N. A. Clark.
Geo. H. Cooper.

INVENTOR
William K. Elson
Andrew J. Smith
by Geo. Walker
att'y

UNITED STATES PATENT OFFICE.

WILLIAM K. ELSON AND ANDREW J. SMITH, OF MARTIN'S FERRY, OHIO, ASSIGNORS TO THE ELSON GLASS COMPANY, OF SAME PLACE.

COVERED DISH.

SPECIFICATION forming part of Letters Patent No. 304,997, dated September 9, 1884.

Application filed January 30, 1884. (No model.)

*To all whom it may concern:*

Be it known that we, WILLIAM K. ELSON, of Martin's Ferry, in the county of Belmont and State of Ohio, and ANDREW J. SMITH, of Martin's Ferry, in the county of Belmont and State of Ohio, have invented a new and useful Improvement in Covered Dishes; and we do hereby declare that the following is a full and exact description of the same, reference being had to the accompanying drawings, and to the letters of reference marked thereon.

Our invention relates to dishes or vessels using covers, which dishes or their covers may be made of any of the well-known materials; and our invention therein consists in a peculiar bail or handle which is adapted for carrying the particular dish, and at the same time to hold the cover suspended over the dish.

For the better understanding of our invention a butter-dish is selected, and the same is represented in the drawings of this application, in which drawings—

Figure 2:
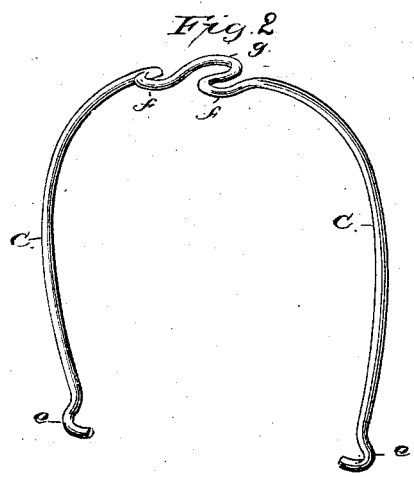
Figure 3:
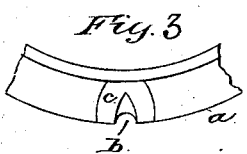

Figure 1 is a perspective elevation of a butter-dish with the cover removed and attached to the bail or handle. Fig. 2 is a separate view of the bail or handle, and Fig. 3 a separate detail of that part of the dish where the bail or handle is secured.

Corresponding letters denote similar parts in each figure.

A represents a butter-dish, having a horizontal flange, $a$, around it, in the edges of which, at opposite points, are notches $b\ b$, preferably re-enforced by rosettes or thicker portions $c\ c$ above and below.

B is the cover to this dish, of ordinary form, having a knob, $d$, at its top, with the usual neck, $d'$.

The bail or handle C is made of spring metal, and has hooked ends $e\ e$, adapted to fit into the notches $b\ b$ and embrace the lower surfaces of the flanges $a$ or the thickened portions $c\ c$, so that the bail or handle, when attached, shall be held firmly in a vertical position. The upper central portion of the bail or handle is first bent outwardly, as at $f$; then is bent in the opposite direction a short distance beyond the general line of the bail or handle, as at $g$; then is bent back to about the same distance as the bend $f$, as shown at $h$, and then is bent back to the general line of the bail or handle, the bend $g$ being of such size in depth and breadth as will receive and embrace the neck $d'$ of the knob $d$ and hold the cover securely directly over the dish or vessel a sufficient distance from it to afford access to its contents. Preferably this bend is so constructed that the knob $d$ will sink in it a little above its neck, so that it would not be displaced by any sudden lateral movement of the dish.

It will be observed that we have described only a butter-dish, for convenience of illustration, as it is evident that our invention may not only be applied to all dishes for table use which may be used with covers, but to all manner of vessels used for other purposes which have or may have horizontal flanges capable of being notched, or separate notched portions attached to their bodies, and which have or may have covers with knobs.

It is also evident that the cover-holding portions of the bail or handle may be applied to any handle, whether removable or not.

The utility of our improvement is so apparent that no mention need be made of its advantages.

Having thus described our invention, what we claim as new therein is—

1. A dish or vessel having a bail or handle into which the cover of the vessel may be removably secured by inserting the neck of its knob into a bend of the handle, substantially as described.

2. A dish or vessel having a detachable bail or handle provided with hooked ends adapted to engage in notches in the vessel, and be held thereby rigidly in a vertical position, substantially as described.

3. In combination, a dish or vessel, a cover to the same, and a rigid vertical bail or handle to the dish or vessel, adapted to hold the cover above the dish or vessel by means of a bend in the bail or handle, which embraces the neck of the knob of the cover, substantially as described.

In testimony whereof we affix our signatures in presence of two witnesses.

WILLIAM K. ELSON.
ANDREW J. SMITH.

Witnesses:
HANNAH G. EDWARDS,
JOSEPH T. HANES.